G. H. BAUST.
AUTOMATIC BEEF SPREADER GAMBREL.
APPLICATION FILED APR. 1, 1907. RENEWED OCT. 30, 1909.
946,195.
Patented Jan. 11, 1910.
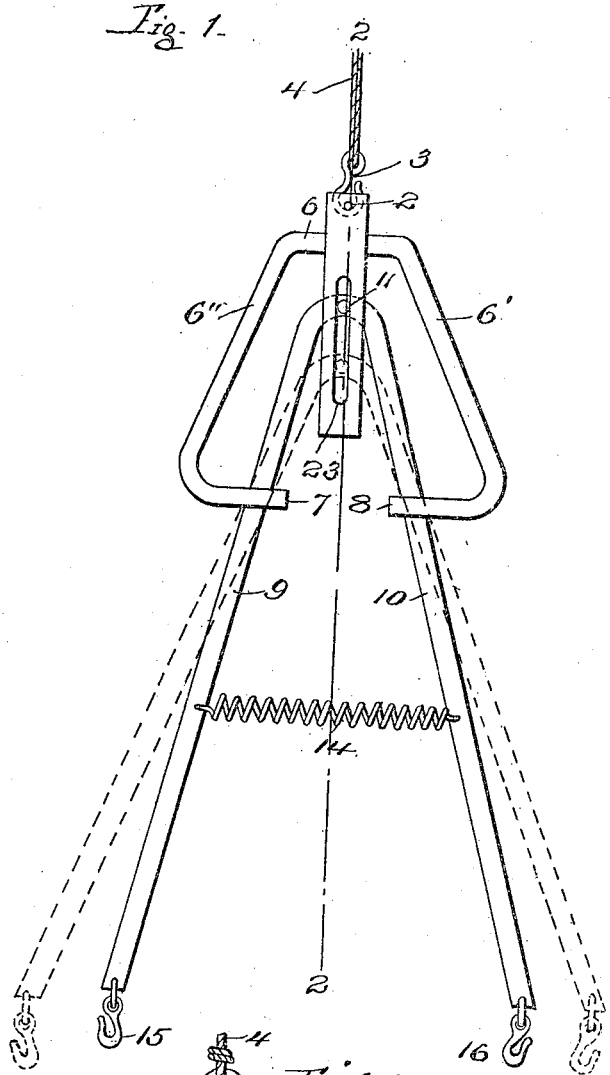
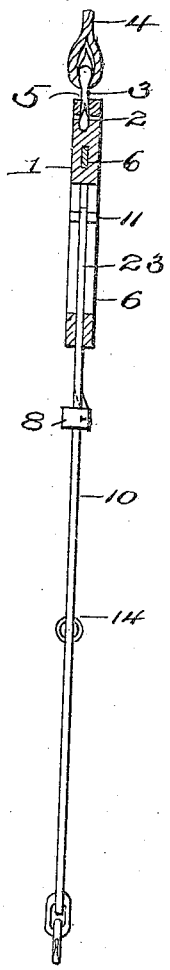
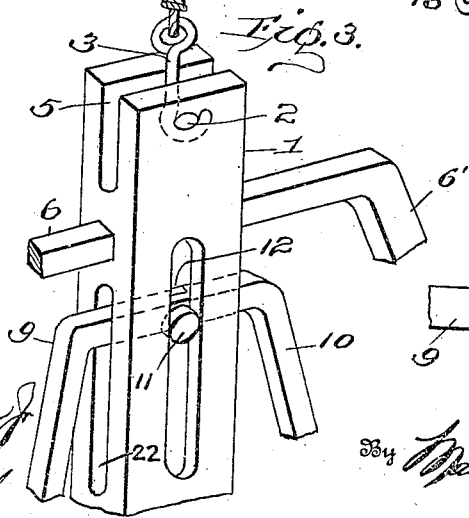
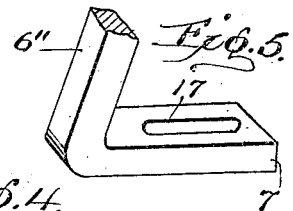
Witnesses
Inventor,
George H. Baust.
By
Attorneys

UNITED STATES PATENT OFFICE.

GEORGE H. BAUST, OF SOUTH OMAHA, NEBRASKA.

AUTOMATIC BEEF-SPREADER GAMBREL.

946,195.  Specification of Letters Patent.  Patented Jan. 11, 1910.

Application filed April 1, 1907, Serial No. 365,885.  Renewed October 30, 1909.  Serial No. 525,554.

*To all whom it may concern:*

Be it known that I, GEORGE H. BAUST, a citizen of the United States, residing at Twelfth and Jackson streets, in the city of South Omaha, Douglas county, and State of Nebraska, have invented a new and useful Automatic Beef-Spreader Gambrel, of which the following is a specification.

This invention relates to improvements in beef or carcass spreaders and is particularly designed to provide portable means for suspending the carcasses of animals for splitting purposes so that the halves of the carcass so suspended will be forced apart.

One of the objects of my invention is to provide means for the spreading of carcasses operated by the weight of the suspended carcasses.

Another object of my invention is to provide means for the spreading of carcasses with the view of increasing the facility of carcass splitting.

A further object of my invention is to provide means for causing the spreading device to automatically return to its normal condition when the suspended carcass is removed.

With these and other objects in view my invention comprises certain novel constructions, combinations and arrangement of parts shown in the drawings and more particularly described in the specification and claims.

Referring to the drawings:—Figure 1 represents an elevation of my invention. Fig. 2 represents a sectional view taken on line 2—2 of Fig. 1. Fig. 3 is a perspective view of the top part of my invention. Fig. 4 is a detail of the suspending arms. Fig. 5 is a detail of a guiding member.

In the drawings similar reference numerals refer to corresponding parts throughout, in which—

1 represents a block formed with an end slot 5, a pin 2 crossing the slot 5 and rigidly secured to the block 1. The slot 5 is adapted to accommodate a hook 3 which is secured to suitable suspending means 4 and is adapted to embrace the pin 2. The block 1 is also formed with a suitable opening adapted to receive a guiding member 6 which is rigidly secured to the block 1 and is formed with downwardly inclined portions 6' and 6" preferably bent at 20 and 21 and having their lower ends 7 and 8 preferably bent at 18 and 19, each end being provided with a suitable slot 17 formed therein and adapted to serve as guides. The block 1 is further provided with a slot 22 formed therein and transecting a slot 23 also formed in said block. Slot 22 is adapted to accommodate suspending arms 9 and 10 which are pivotally connected at their upper ends 12 and 13 by a suitable pin 11, and slot 23 is adapted to serve as a track for pin 11. The pivoted suspending arms or members 9 and 10 are provided with a suitable spring 14 secured thereto and suitable hooks 15 and 16 adapted to grasp the carcass of an animal.

When it is desired to employ my invention for the splitting of the carcass of an animal the block 1 is suspended by means of a suitable hook 3 and rope 4 or equivalent means and the carcass of the animal, a beef for instance, to be split is suspended on the hooks 15 and 16. When the cleaver of the splitter is exercised on the carcass the members 9 and 10 are automatically forced apart and pin 11 drops in slot 23 by the weight of the carcass, as shown in dotted lines in Fig. 1, and the work of splitting is rendered more efficient and expeditious. There is no mechanism requiring the attention of the splitter, nothing necessitating special direction, since the combination of the slotted block 1 and the guide member 6, the pivoted suspending arms 9 and 10 operating in the slotted block and the spring eliminate by a simple arrangement the necessity for manual direction. It is evident that the suspended arms 9 and 10 are automatically returned to their normal position by means of spring 14 so that the spreader will automatically resume its normal position to receive another carcass.

What I claim and desire to secure by Letters Patent is:—

1. In a device of the class described, a block, a frame carried by the block, arms positioned by the frame and hinged members movable in the arms and slidable in the block.

2. In a device of the class described, a block provided with transecting slots, a frame carried by and extending rigidly below the block, diverging arms slidably mounted within the frame and extending within one slot of the block, and a pin extending through the other slot of the block and serving as a hinge for the diverging arms.

3. In a device of the class described, a block provided with transecting slots, a frame secured to and extending rigidly below the block, diverging arms slidably mounted within the frame, and having their upper ends extending within one of the slots, a pin extending through the other slot and serving as a pivot pin for the arms and as a guide within the slot, and means to draw the lower ends of the diverging arms toward each other.

GEORGE H. BAUST.

Witnesses:
J. EDSON HEATH,
ARTHUR C. PANCOAST.